United States Patent
Stohr et al.

(10) Patent No.: US 8,262,793 B2
(45) Date of Patent: Sep. 11, 2012

(54) DUST FREE POWDERY BUILDING MATERIAL COMPOSITION

(75) Inventors: Werner Stohr, Augsburg (DE); Klaus-Dieter Hötzl, Augsburg (DE); Wolfgang Seidl, Palling (DE); Siegfried Zuern, Eurasburg (DE); Steffen Wache, Breitbrunn (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 13/264,344

(22) PCT Filed: Apr. 13, 2010

(86) PCT No.: PCT/EP2010/054786
§ 371 (c)(1),
(2), (4) Date: Dec. 16, 2011

(87) PCT Pub. No.: WO2010/119017
PCT Pub. Date: Oct. 21, 2010

(65) Prior Publication Data
US 2012/0097076 A1    Apr. 26, 2012

(51) Int. Cl.
C04B 24/04 (2006.01)
C04B 28/02 (2006.01)
C04B 40/06 (2006.01)
C04B 24/08 (2006.01)
B05D 5/00 (2006.01)
B05D 1/02 (2006.01)

(52) U.S. Cl. ...... 106/810; 106/728; 106/823; 427/421.1
(58) Field of Classification Search ............ 106/728, 106/810, 823; 427/421.1
See application file for complete search history.

(56) References Cited

U.S. PATENT DOCUMENTS

| 4,780,143 A | 10/1988 | Roe |
| 6,278,008 B1 * | 8/2001 | Endo et al. ............ 554/227 |
| 6,703,436 B2 | 3/2004 | Lee et al. |
| 2006/0052261 A1 * | 3/2006 | Kray et al. ............ 508/552 |

FOREIGN PATENT DOCUMENTS

| DE | 02 2006 016 797 U1 | 2/2007 |
| WO | WO 02/068522 A1 | 9/2002 |
| WO | WO 2006/084588 A2 | 8/2006 |

OTHER PUBLICATIONS

PCT/EP2010/054786-International Search Report, Aug. 19, 2010.

* cited by examiner

Primary Examiner — Anthony J Green
(74) Attorney, Agent, or Firm — Curatolo Sidoti Co., LPA; Joseph G. Curatolo; Salvatore A. Sidoti

(57) ABSTRACT

The invention relates to a pulverulent building material composition, preferably a factory dry mortar and in particular a tile adhesive, joint grout, knifing filler, sealing slurry, repair mortar, equalization mortar, basecoat adhesive, adhesive for composite thermal insulation systems (CTISs), mineral plaster or render, fine knifing filler or screed system, containing an ester of A) at least one compound selected from the group consisting of neopentyl glycol, 2-methyl-2-(hydroxymethyl)-1,3-propanediol and pentaerythritol with B) a carboxylic acid component.

15 Claims, No Drawings

DUST FREE POWDERY BUILDING MATERIAL COMPOSITION

CROSS REFERENCE TO RELATED APPLICATIONS

This application is a national stage application of International Application No. PCT/EP2010/054786, filed 13 Apr. 2010, which claims priority from European Patent Application Serial No. 09157837.7, filed 14 Apr. 2009, from which applications priority is claimed, and which are incorporated herein by reference.

The present invention relates to pulverulent building material compositions containing an ester of at least one compound selected from the group consisting of neopentyl glycol, 2-methyl-2-(hydroxymethyl)-1,3-propanediol and pentaerythritol with a carboxylic acid component, a process for producing such products and their use.

Dry, pulverulent building material compositions such as hydraulically setting compositions based on cement, pozzolana or lime and non-hydraulically setting compositions based on gypsum plaster and air-curing lime (e.g. tile adhesives, joint grouts, knifing fillers, sealing slurries, plasters and renders, screeds, etc.) have a particular tendency to form significant amounts of dust during transfer and mixing processes. Numerous attempts have therefore been made to avoid or completely suppress dust formation in the case of such products.

Thus, for example, it has been attempted to reduce dust formation in the case of hydraulically setting compositions via the degree of milling or the particle size composition of the pulverulent products, but the processability of coarser powders is significantly poorer.

A further known method is aggregation of fine particles, e.g. by means of water, aqueous solutions or dispersions. Thus, for example, it is known from U.S. Pat. No. 4,780,143 that clinker can be admixed with aqueous foam before milling to produce cement in order to reduce dust formation. Attempts have also been made to add polymer dispersions to cements for spray concrete compositions in order to reduce dust formation. However, such an aggregation is disadvantageous when the resulting low-dust hydraulically setting compositions are no longer milled subsequently. In the case of finely pulverulent knifing fillers, coarser aggregations are not acceptable since they show up to a significant extent on smooth surfaces.

The use of dust-reducing agents which are added to the make-up water for cement in order to reduce dusting in the application of spray concrete or spray mortar is also known. For this purpose, polyethylene glycols or ethylene oxide/propylene oxide block copolymers, in particular, are added as dust-reducing agents or additives for reducing dust formation. However, such additives frequently have an adverse effect on the processing behaviour since they lead, in particular, to retardation of setting or to a pronounced hygroscopic nature of the building chemical products. If, as an alternative, hydrophobic additives, which likewise include ethylene oxide/propylene oxide block copolymers, are used, wetting difficulties are encountered, especially in the case of pulverulent building chemical products.

WO 2006/084588 A1 discloses the use of aliphatic hydrocarbons and hydrocarbon mixtures as additives for reducing dusting of dry and in particular pulverulent building chemical products such as tile adhesives, joint grouts, knifing fillers, sealing slurries, etc. In particular, hydrocarbons which are liquid under normal conditions are described, with particular mention being made of aliphatic hydrocarbons, in particular in linear or branched, saturated or unsaturated form, having boiling points of from 100 to 400° C.

The utility model DE 20 2006 016 797 U1 relates to a low-dust dry mortar which contains at least one dust-reducing component in an amount of from 0.01 to 10% by weight, based on the total dry mixture. The dust-reducing component is selected here from the group consisting of monoalcohols, e.g. 3-methoxybutanol, benzyl alcohol, 1,2-propanediol, hexanol, diacetone alcohol, ethyl diglycol, isopropanol, 2-ethylhexanol and/or alkanediols such as 2-methylpentane-2,4-diol, neopentyl glycol and n-butane-2,5-diol. According to this publication, glycols, polyethylene glycols, fatty alcohols and polyphenyl alcohols are also suitable. Mention is also made of aliphatic ethers, cellulose ethers, alkoxylates and methyl/ethyl fatty acid ethers.

The measures known from the prior art have still not been able, especially from an economic point of view, to satisfactorily solve the basic problem of dusting of pulverulent building material compositions.

Furthermore, the emission of volatile organic compounds (VOCs) from building material mixtures represents a great problem in terms of environmental protection. VOC emissions are by definition caused by volatile organic compounds which have a boiling point of less than 250° C. under atmospheric pressure (Directive 2004/42/EC of 21 Apr. 2004 on the limitation of emissions of volatile organic compounds). For this reason, the European VOC Directive sets down maximum limits for volatile organic compounds.

It was therefore an object of the present invention to provide pulverulent building material compositions which have a significantly reduced tendency to form dust. The additives used for this purpose should be simple to apply and at the same time have a high effectiveness. In addition, they should not have a tendency to form lumps in use and should not have an adverse effect on the required property profile of the products, in particular the scratch resistance, pressure resistance and adhesive pull strength. A further object of the present invention was to provide additives which emit very small amounts of volatile organic compounds (VOCs) during storage and use of the building material compositions.

This object has been achieved by the provision of a pulverulent building material composition containing an ester of A) at least one compound selected from the group consisting of neopentyl glycol, 2-methyl-2-(hydroxymethyl)-1,3-propanediol and pentaerythritol with B) a carboxylic acid component.

Apart from the object having been able to be completely achieved in respect of all tasks, it has surprisingly been found that the esters used according to the invention have a lasting high effectiveness over a prolonged period of time and cause only very low or no VOC emissions compared to the prior art.

The use of the expression "carboxylic acid component" takes account of the fact that B) can be either a carboxylic acid or a mixture of carboxylic acids, with it also being possible, in particular, to use isomer mixtures. The carboxylic acids in question are preferably monocarboxylic acids.

For the purposes of the present invention, esters whose carboxylic acid component contains linear and/or branched and/or cyclic, saturated and/or unsaturated alkyl radicals are particularly suitable. The alkyl radicals are preferably linear and/or branched, saturated alkyl radicals, with particular preference being given to branched alkyl radicals.

In a preferred embodiment, the carboxylic acid component is at least one $C_4$-$C_{30}$-carboxylic acid, preferably at least one $C_5$-$C_{12}$-carboxylic acid, in particular at least one $C_6$-$C_9$-carboxylic acid and particularly preferably at least one $C_8$-carboxylic acid.

Specific examples of the carboxylic acid components are unbranched saturated aliphatic monocarboxylic acids such as butyric acid, valeric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidonic acid, heneicosanoic acid, behenic acid, tricosanoic acid, lignoceric acid, pentacosanoic acid, cerotinic acid, heptacosanoic acid, montanic acid, nonacosanoic acid, melissic acid and also branched saturated aliphatic monocarboxylic acids such as isobutyric acid, isovaleric acid, pivalic acid, 2-methylbutyric acid, 2-methylvaleric acid, 3-methylvaleric acid, 4-methylvaleric acid, 2,2-dimethylbutyric acid, 2-ethylbutyric acid, tert-butylacetic acid, cyclopentanecarboxylic acid, 2,2-dimethylpentanoic acid, 2,4-dimethylpentanoic acid, 2-ethylpentanoic acid, 3-ethylpentanoic acid, 2-methylhexanoic acid, 3-methylhexanoic acid, 4-methylhexanoic acid, 5-methylhexanoic acid, cyclohexanecarboxylic acid, cyclopentylacetic acid, 2-ethylhexanoic acid, 3-ethylhexanoic acid, 2,2-dimethylhexanoic acid, 3,5-dimethylhexanoic acid, 2,4-dimethylhexanoic acid, 3,4-dimethylhexanoic acid, 4,5-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, cyclohexylacetic acid, 3-cyclopentylpropionic acid, 2,2-dimethylheptanoic acid, 2-methyloctanoic acid, 2-ethylheptanoic acid, 3-methyloctanoic acid, 2-ethyl-2,3,3,3-trimethylbutyric acid, 2,2,4,4-tetramethylpentanoic acid, 2,2,3,3-tetramethylpentanoic acid, 2,2,3,4-tetramethylpentanoic acid and also unsaturated aliphatic monocarboxylic acids such as but-2-enoic acid, but-3-enoic acid, buta-2,3-dienoic acid, pent-2-enoic acid, pent-3-enoic acid, pent-4-enoic acid, penta-2,3-dienoic acid, penta-2,4-dienoic acid, hex-2-enoic acid, hex-3-enoic acid, hex-4-enoic acid, hexa-2,4-dienoic acid, octadec-9-enoic acid, octadec-11-enoic acid, octadeca-9,12-dienoic acid, octadeca-9,12,15-trienoic acid, octadeca-9,11,13-trienoic acid, eicosa-5,8,11,14-tetraenoic acid, docos-13-enoic acid, but-2-ynoic acid, pent-4-ynoic acid, octadec-9-ynoic acid and 3,7-dimethylocta-2,6-dienoic acid.

The carboxylic acid component can comprise at least one of the compounds mentioned or consist thereof. In a particularly preferred embodiment, the carboxylic acid component consists of 2-ethylhexanoic acid.

The esters of neopentyl glycol can, according to the invention, be monoesters or diesters or a mixture of these compounds. Preference is given to diesters of neopentyl glycol. In the case of 2-methyl-2-(hydroxymethyl)-1,3-propanediol, the esters can be monoesters, diesters or triesters or a mixture of these compounds. Preference is given to triesters of 2-methyl-2-(hydroxymethyl)-1,3-propanediol. In the case of the esters of pentaerythritol, these can be, according to the invention, monoesters, diesters, triesters or tetraesters or a mixture of these compounds. In a preferred embodiment, the esters are tetraesters of pentaerythritol.

If mixtures of esters of neopentyl glycol and/or 2-methyl-2-(hydroxymethyl)-1,3-propanediol and/or pentaerythritol are present, each alcohol component A) can be esterified with the same carboxylic acid component B), where B) can be one carboxylic acid or a mixture of carboxylic acids. However, it is also possible for each alcohol component A) to be esterified with a different carboxylic acid component B), where once again B) can in each case be one carboxylic acid or a mixture of carboxylic acids.

Processes for preparing esters of neopentyl glycol are disclosed in WO 02068522 on pages 6 to 11, with these processes being incorporated by reference into the present patent application. The preparative process can be applied analogously to 2-methyl-2-(hydroxymethyl)-1,3-propanediol and pentaerythritol.

It has been found to be particularly advantageous to use the esters employed according to the invention in liquid form. The advantage of this variant is that liquid use forms can be applied more readily to the pulverulent building material compositions which are to be prevented from forming dust and that the application overall is more homogeneous compared to solid variants. In addition, smaller amounts are required in the case of liquid esters to be used according to the invention. Of course, the adhesion and the initial adhesion of liquid additives is improved in comparison with solid variants. The esters used according to the invention preferably have a kinematic viscosity at 20° C. of from 0.1 to 150 mm$^2$/s, in particular from 2 to 50 mm$^2$/s.

The pulverulent building material compositions containing at least one ester used according to the invention should, for the purposes of the present invention, preferably be present in dry form, meaning that these compositions have a water content determined by the Karl-Fischer method of less than 5% by weight, preferably less than 1% by weight and particularly preferably less than 0.1% by weight.

The average particle size of the respective pulverulent building material compositions should preferably extend from 0.01 to 5 mm. It has been found to be particularly advantageous for the pulverulent building material compositions to have a particle size fraction determined by laser light scattering of at least 2% by weight≦68 μm and at least 10% by weight≦200 μm. Particularly in the case of the very fine variants, the dust elimination potential of the esters used according to the invention is particularly apparent.

In principle, the dust formation from any pulverulent building material compositions can be significantly reduced by means of the esters used according to the invention. As representatives of the building material compositions, particular mention may be made of hydraulically setting cement-based and non-hydraulically setting gypsum plaster-based compositions, known as factory dry mortars, in which finely milled mineral materials cure to form a rock-like mass with uptake of water in air or under water and are functional after curing. Such factory dry mortars are generally commercially available as fine powders which are then mixed with the make-up water in the final mixing on the building site. During transfer of material between or emptying of the transport containers, disadvantageous severe dust formation can occur and this can be significantly reduced or completely prevented by use of the esters which are now proposed.

The use according to the invention has been found to be particularly advantageous when the factory dry mortar is a tile adhesive, joint grout, knifing filler, sealing slurry, repair mortar, equalization mortar, basecoat adhesive, adhesive for composite thermal insulation systems (CTISs), mineral plaster or render, fine knifing filler or screed system.

Pulverulent polymers and in particular redispersible polymer powders or tile adhesives which represent the pulverulent building material compositions or which are present as their pulverulent constituents are also suitable for the additives used according to the invention. The abovementioned redispersible polymer powders are preferably made up of at least one representative of the group consisting of vinyl acetate, styrene, butadiene, ethylene, the vinyl ester of Versatic acid, urea-formaldehyde condensation products and melamine-formaldehyde condensation products.

In order to actually achieve the elimination of dust or the reduction of dust to the desired advantageous degree, it is advisable to add the esters used according to the invention to the preferably dry, pulverulent building material compositions in an amount of from 0.01 to 4% by weight, preferably from 0.3 to 3% by weight and particularly preferably from 0.5 to 2.0% by weight.

Of course, the respective pulverulent building material compositions whose dust formation is to be reduced and to which the additives are added according to the invention can also contain at least one representative of the group consisting of binders, fillers, thickeners, water retention agents, dispersants, rheology improvers, antifoams, retarders, accelerators, additives, pigments, organic or inorganic fibres in addition to the abovementioned fine particles.

In a preferred embodiment, the pulverulent building material composition comprises from 10 to 75% by weight of fillers such as silica sand, ground limestone, barite, lightweight filler and/or ground slate, from 1 to 5% by weight of dispersion powder, from 0.1 to 5% by weight of water retention agents such as cellulose ethers and/or SISA (salt insensitive superabsorbents), from 0.1 to 3% by weight of thickeners such as starch ethers and/or polyacrylamide, from 0.1 to 3% by weight of cement accelerators such as calcium formate and from 0.1 to 3% by weight of cement retarders such as citrate.

It is basically recommended that the pulverulent building material compositions whose dusting tendency is to be reduced according to the present invention have a proportion of binder in the range from 5 to 80% by weight, preferably from 10 to 70% by weight and particularly preferably from 15 to 50% by weight.

The esters used according to the invention are generally oxidation-stable and do not undergo any chemical reactions with, in particular, atmosphere oxygen, so that their dust elimination properties in respect of the pulverulent building material compositions are at least essentially unchanged even after prolonged storage.

Preference is given, according to the invention, for the esters used as dust reduction additives in the building material compositions to have a vaporization loss over 24 hours at a temperature of 107° C. of less than 5% by weight, preferably less than 2% by weight, particularly preferably less than 1% by weight. In this way, it is ensured that, firstly, long-term dust reduction in respect of the pulverulent building material compositions which are being treated according to the invention is achieved and, secondly, the products which have been treated according to the invention are at least essentially odour-free or low in odour since no esters are liberated in appreciable amounts.

The building material mixtures according to the invention are generally mixed with water before or during use, with predominantly alkaline mixtures being formed. It is known that carboxylic esters hydrolyse at least partially in these alkaline mixtures. Since the hydrolysis products of the esters have a significantly lower molecular weight, a significant VOC emission was to be expected. However, it has surprisingly been found that the esters used according to the invention cause only very slight or no VOC emissions from the building material mixtures even after addition of water. This was not to be expected since the hydrolysis products such as neopentyl glycol (boiling point: 208° C.) and also most carboxylic acid components used according to the invention have a boiling point of less than 250° C.

A further aspect of the present invention is the use of at least one ester according to the invention as additive in pulverulent building material compositions in order to reduce dusting.

The present invention also encompasses a process for producing, in particular, dry, pulverulent building material compositions having reduced dust formation and dusting behaviour. This process is, according to the invention, characterized in that the pulverulent building material compositions are brought into contact with at least one ester according to the invention as dust reduction agent, which can, in particular, be effected by spraying on. The esters used here have the abovementioned properties.

Finally, the present invention also encompasses, in particular, dry, pulverulent building material compositions which have reduced dusting and dust formation behaviour and can be produced by the process just described, namely by contacting and in particular by spraying on while stirring. These products are once again advantageously cement- and/or lime- and/or gypsum plaster-based compositions or binders such as dry mortars and in particular tile adhesives, joint grouts, knifing fillers, sealing slurries, repair mortars, equalization mortars, basecoat adhesives, CTIS adhesives, mineral plasters and renders, fine knifing fillers and screed systems.

In general, the treatment which has already been mentioned a number of times or the contacting is effected by spraying or atomizing the selected dust-elimination or dust-reducing additives onto the pulverulent building material compositions. In this way, homogeneous application can be ensured in a simple way together with good adhesion and initial adhesion. Of course, the contacting of the pulverulent building material compositions with the respective additive can also be carried out in any other suitable way with which those skilled in the art are familiar. Possibilities here are, in particular, mixing or stirring together with the liquid additives, but spray application is clearly to be preferred since this is the simplest and economically most attractive application variant.

The esters employed for the use according to the invention can naturally also be assisted in their dust-reducing or dust elimination action by means of all other suitable additives. Even when the esters proposed are fully sufficient in the major number of uses in order to reduce or completely prevent dusting of pulverulent building material compositions, it can in specific cases be useful to assist the advantageous effect of these additives by means of other additives which likewise reduce dusting behaviour.

Overall, the proposed esters make available additives by means of which dusting of pulverulent building material compositions can be homogeneously and stably reduced in a simple and economical way, so that, particularly from the point of occupational hygiene, in particular in the transfer and processing operation, a significant advance is apparent. Furthermore, the required property profile of the building material compositions, in particular the scratch resistance, pressure resistance and adhesive pull strength, is not adversely affected compared to the prior art by the additives according to the invention.

The following examples illustrate the advantages of the present invention.

EXAMPLES

Dry Mortar Mixtures

| Mixture 1 | |
|---|---|
| Portland cement CEM I | 85.0% by weight |
| Lightweight filler (Poraver sehr fein from Dennert Poraver GmbH) | 15.0% by weight |

| Tile adhesive 1 | |
|---|---|
| Portland cement CEM I | 37.0% by weight |
| Silica sand 0.1-0.5 mm | 47.5% by weight |
| Ground slag sand | 14.3% by weight |
| Ground limestone < 0.1 mm | 3.3% by weight |
| Cellulose ether | 0.9% by weight |
| Dispersion powder (Elotex AP 200 from Elotex AG) | 1.5% by weight |
| Curing accelerator (calcium formate) | 0.5% by weight |

| Tile adhesive 2 | |
|---|---|
| Portland cement CEM I | 65.0% by weight |
| Lightweight filler < 0.1 mm | 15.0% by weight |
| Ground limestone < 0.1 mm | 15.6% by weight |
| Cellulose ether | 0.9% by weight |
| Dispersion powder (Elotex AP 200 from Elotex AG) | 3.0% by weight |
| Curing accelerator (calcium formate) | 0.5% by weight |

Measurement Method:

The measurements were carried out by a method based on DIN 55999-2 "Bestimmung einer Maßzahl für die Staubentwicklung von Pigmenten and Füllstoffen-Teil 2: Fallmethode".

The "dust measuring instrument SP3" from LORENZ MESSGERÄTEBAU GmbH & Co. KG was used for the measurement.

Specimen Production:

The respective dry mortar mixtures were placed in a mixing vessel. The dust-reducing additive according to the invention was applied to the mortar in the indicated ratio to the dry mortar mixture by means of a pressure sprayer ("garden sprayer") during mixing and mixed with the mortar.

Results:

| | Dust number after 1 d | Dust number after 3 d | Dust number after 7 d |
|---|---|---|---|
| Mixture 1 (comparison) | 117 | — | — |
| Mixture 1 + 0.5% of Soldoc VF8 (according to the invention) | 42 | 44 | 42 |
| Mixture 1 + 1.0% of Soldoc VF8 (according to the invention) | 22 | 22 | 19 |
| Mixture 1 + 1.5% of Soldoc VF8 (according to the invention) | 14 | 12 | 11 |
| Mixture 1 + 0.5% of Hexamoll DINCH | 100 | 110 | 114 |
| Mixture 1 + 1.0% of Hexamoll DINCH | 84 | 67 | 68 |
| Mixture 1 + 1.5% of Hexamoll DINCH | 75 | 54 | 43 |

| | Dust number after 1 d | Dust number after 7 d | Dust number after 56 d |
|---|---|---|---|
| Tile adhesive 1 (comparison) | 142 | — | — |
| Tile adhesive 1 + 0.75% of Soldoc VF8 (according to the invention) | 11 | 12 | 22 |
| Tile adhesive 1 + 1.0% of Soldoc VF8 (according to the invention) | 8 | 7 | 19 |
| Tile adhesive 2 (comparison) | 166 | — | — |
| Tile adhesive 2 + 1.0% of Soldoc VF8 (according to the invention) | 8 | 10 | 9 |
| Tile adhesive 2 + 3% of Soldoc VF8 (according to the invention) | 3 | 3 | 3 |

Soldoc VF8: neopentyl glycol di-2-ethylhexanoate from Industrial Quimica Lasem S.A.
Hexamoll DINCH: diisononyl cyclohexane-1,2-dicarboxylate from BASF SE
d: days Measurement Method:

The tests were carried out in accordance with the GEV test method, 26 Apr. 2007 version (see www.emicode.de).

Specimen Production:

Tile adhesive 2 was placed in a mixing vessel. The dust-reducing additive according to the invention Soldoc VF 8 was applied in an amount of 1.5% by weight to the dry mortar mixture by means of a pressure sprayer ("garden sprayer") and mixed with the mortar.

Results:

| Adhesive materials testing after 72 hours. | | |
|---|---|---|
| Material | concentration | required detection limit |
| Acrylamide | b.d. | 10 µg/m$^3$ |
| Acrylonitrile | b.d. | 10 µg/m$^3$ |
| Benzene | b.d. | 02 µg/m$^3$ |
| 1,4 Dioxane | b.d. | 50 µg/m$^3$ |
| Vinyl acetate | b.d. | 50 µg/m$^3$ |
| Formaldehyde | <5 µg/m$^3$ | 50 µg/m$^3$ |
| Acetaldehyde | 10 µg/m$^3$ | 50 µg/m$^3$ | b.d.: below detection limit

Emission testing after 10 days: total TVOC 35 µg/m$^3$
Class thus achieved: EC1 "very low emission".

The classification corresponds to the criteria for "Mineral products with predominantly inorganic binders" (EC1<200 µg/m$^3$ TVOC).

The invention claimed is:

1. Pulverulent building material composition comprising a factory dry mortar, containing at least one ester of
    A) 2-ethylhexanoic acid and
    B) an alcohol having a boiling point of at least 160° C.

2. The building material composition according to claim 1, wherein the alcohol is a monofunctional, bifunctional, trifunctional or tetrafunctional alcohol.

3. The building material composition according to claim 1, wherein the alcohol is a bifunctional, trifunctional or tetrafunctional alcohol, with at least two OH groups of the alcohol being esterified by 2-ethylhexanoic acid.

4. The building material composition according to claim 1, wherein the alcohol contains linear and/or branched and/or cyclic, saturated and/or unsaturated alkyl radicals.

5. The building material composition according to claim 1, wherein the alcohol is neopentyl glycol, 2-methyl-2-(hydroxymethyl)-1,3-propanediol, pentaerythritol, 2-ethylhexyl alcohol, or ceteryl alcohol.

6. The building material composition according to claim 1, wherein the ester is at least one diester of neopentyl glycol.

7. The building material composition according to claim 1, wherein the building material contains pulverulent polymer.

8. The building material composition according to claim 7, wherein the building material contains redispersible polymer powder.

9. The building material composition according to claim 8, wherein the redispersible polymer powder is made up of at least one representative of the group consisting of vinyl acetate, styrene, butadiene, ethylene, Versatic acid, vinyl esters, urea-formaldehyde condensation products and melamine-formaldehyde condensation products.

10. The building material composition according to claim 1, wherein the building material composition contains the ester in an amount of from 0.01 to 4% by weight.

11. The building material composition according to claim 1, wherein the building material composition additionally contains at least one representative of the group consisting of binders, fillers, thickeners, water retention agents, dispersants, rheology improvers, antifoams, retarders, accelerators, additives, pigments, organic fibres, and inorganic fibres.

12. The building material composition according to claim 1, wherein the building material composition has a proportion of hydraulic binder in the range from 5 to 80% by weight.

13. The building material composition according to claim 1, wherein the building material composition contains at least one representative of the group consisting of from 10 to 75% by weight of fillers, from 1 to 5% by weight of dispersion powders, from 0.1 to 5% by weight of water retention agents, from 0.1 to 3% by weight of thickeners, from 0.1 to 3% by weight of cement accelerators, and from 0.1 to 3% by weight of cement retarders.

14. A process for producing a pulverulent building material composition, comprising contacting a pulverulent building material composition comprising a factory dry mortar with a dust reducing additive comprising at least one ester of A) 2-ethylhexanoic acid and B) an alcohol having a boiling point of at least 160° C.

15. The process of claim 14, comprising spraying the at least one ester on the pulverulent building material composition while stirring.

* * * * *